US008386500B2

(12) United States Patent
Mao

(10) Patent No.: US 8,386,500 B2
(45) Date of Patent: Feb. 26, 2013

(54) APPARATUS, SYSTEM, AND METHOD FOR XML BASED DISCONNECTED DATA ACCESS FOR MULTIVALUED/HIERARCHICAL DATABASES

(75) Inventor: Jianfeng Mao, Highlands, CO (US)

(73) Assignee: Rocket Software, Inc., Newton, MA (US)

( * ) Notice: Subject to any disclaimer, the term of this patent is extended or adjusted under 35 U.S.C. 154(b) by 1206 days.

(21) Appl. No.: 11/846,502

(22) Filed: Aug. 28, 2007

(65) Prior Publication Data

US 2009/0064037 A1 Mar. 5, 2009

(51) Int. Cl.
*G06F 7/00* (2006.01)
(52) U.S. Cl. ........................................ 707/756
(58) Field of Classification Search ................ 707/756, 707/760, 999.1, 999.101, 999.102, 999.103, 707/999.104, 999.105, 999.106, 999.107
See application file for complete search history.

(56) References Cited

U.S. PATENT DOCUMENTS

| | | | |
|---|---|---|---|
| 6,772,159 B1 | 8/2004 | Blount et al. | |
| 6,868,528 B2 | 3/2005 | Roberts | 715/853 |
| 7,013,311 B2 | 3/2006 | Hui et al. | 707/104.1 |
| 7,127,469 B2 | 10/2006 | Lindblad et al. | 707/102 |
| 7,149,742 B1 | 12/2006 | Eastham et al. | |
| 7,165,239 B2 | 1/2007 | Hejlsberg et al. | 717/114 |
| 7,747,657 B2 * | 6/2010 | Singh | 707/803 |
| 2004/0267760 A1 * | 12/2004 | Brundage et al. | 707/100 |
| 2005/0203884 A1 | 9/2005 | Allen et al. | 707/3 |
| 2006/0224692 A1 * | 10/2006 | Gupta | 709/217 |
| 2008/0183674 A1 * | 7/2008 | Bush et al. | 707/3 |

OTHER PUBLICATIONS

Sahoo, S.K. et al., "Supporting XML Based High-level Abstractions on HDf5 Datasets: a Case Study in Automatic Data Virtualization", 2005.
Schewe, K.D.; "Redundancy, Dependencies and Normal Forms for XML Databases", 2005.
Chen, L. et al.; "XQuery Containment in Presence of Variable Binding Dependencies", 2005.
Lee, D. et al.; "NeT & CoT: Translating Relational Schemas to XML Schemes Using Semantic Constraints", 2002.

* cited by examiner

*Primary Examiner* — Amy Ng
(74) *Attorney, Agent, or Firm* — Kunzler Law Group

(57) ABSTRACT

An apparatus, system, and method are disclosed for providing a client with disconnected data access to a non-relational database. A command module requests non-relational XML data from a non-relational database using an XML mapping in response to a non-relational data request. A fill module receives the non-relational XML data from the non-relational database and populates one or more data access sets with the non-relational XML data. A communications module transmits the one or more data access sets to an integration broker in communication with the integration adapter.

20 Claims, 6 Drawing Sheets

XML Mapping
400

404
---------Mapping file: STUDENT.MAP---------
```
<?xml version="1.0" ?>
<!-- DOCTYPE U2XMAP SYSTEM
"U2XMAP.DTD" -->
<U2XMAP version="1.0"
Name="STUDENT~2032.map" RootElement=
"_XMAP_ROOT">
    <OPTIONS>
    </OPTIONS>
    <!-- Table/Class map
STUDENT_STUDENT -->
    <TABLECLASSMAP
MapName="STUDENT_STUDENT"
StartNode="/_XMAP_ROOT/STUDENT"
TableName="STUDENT">
        <ColumnMap Node="@ID"
Column="ID"/>
        <ColumnMap Node="@FNAME"
Column="FNAME"/>
        <ColumnMap Node="@LNAME"
Column="LNAME"/>
        <ColumnMap Node="@MAJOR"
Column="MAJOR"/>
        <ColumnMap Node="@MINOR"
Column="MINOR"/>
        <ColumnMap Node="@ADVISOR"
Column="ADVISOR"/>
        <ColumnMap
Node="CGA,@SEMESTER"
Column="SEMESTER"/>
        <ColumnMap
Node="CGA,CGA_MS,@COURSE_GRD"
Column="COURSE_GRD"/>
        <ColumnMap
Node="CGA,CGA_MS,@COURSE_NBR"
Column="COURSE_NBR"/>
    </TABLECLASSMAP>
</U2XMAP>
```

XML Data
402

414
---------- XML output: STUDENT.XML ----------
```
<?xml version="1.0" encoding="UTF-8"?>
<_XMAP_ROOT>
  <STUDENT ID="521814564" FNAME="Harry"
LNAME="Smith" MAJOR="CH" MINOR="PY"
ADVISOR="Carnes">
    <CGA SEMESTER="FA93">
      <CGA_MS COURSE_GRD="A"
COURSE_NBR="CS130"/>
      <CGA_MS COURSE_GRD="B"
COURSE_NBR="CS100"/>
      <CGA_MS COURSE_GRD="B"
COURSE_NBR="PY100"/>
    </CGA>
    <CGA SEMESTER="SP94">
      <CGA_MS COURSE_GRD="B"
COURSE_NBR="CS131"/>
      <CGA_MS COURSE_GRD="B"
COURSE_NBR="CS101"/>
      <CGA_MS COURSE_GRD="A"
COURSE_NBR="PE220"/>
    </CGA>
  </STUDENT>
  <STUDENT ID="978766676"
FNAME="Gerhardt" LNAME="Muller"
MAJOR="FA" MINOR="PY"
ADVISOR="Carnes">
    <CGA SEMESTER="SP94">
      <CGA_MS COURSE_GRD="A"
COURSE_NBR="FA121"/>
      <CGA_MS COURSE_GRD="B"
COURSE_NBR="FA231"/>
      <CGA_MS COURSE_GRD="I"
COURSE_NBR="HY102"/>
    </CGA>
  </STUDENT>
</_XMAP_ROOT>
```

FIG. 4

APPARATUS, SYSTEM, AND METHOD FOR XML BASED DISCONNECTED DATA ACCESS FOR MULTIVALUED/HIERARCHICAL DATABASES

CROSS-REFERENCES TO RELATED APPLICATIONS

This application is related to U.S. patent application Ser. No. 11/846,473 entitled "APPARATUS, SYSTEM, AND METHOD FOR XML BASED DISCONNECTED DATA ACCESS FOR MULTIVALUED/HIERARCHICAL DATABASES" and filed on Aug. 28, 2007 for Jianfeng Mao, which is incorporated by reference herein in its entirety.

BACKGROUND OF THE INVENTION

1. Field of the Invention

This invention relates to disconnected database access and more particularly relates to XML based disconnected database access to multivalued/hierarchical databases.

2. Description of the Related Art

As network use and network sizes increase, disconnected database access is becoming increasingly important. When using disconnected access, a disconnected client remains disconnected from a data source except during data retrieval from the data source and data writes to the data source. Between data retrieval and data writes, the disconnected client may access, edit, manipulate, and update data from the data source in a local cache. Disconnected data access offers scalability and performance benefits over connected access by allowing a higher number of users access to database data simultaneously, while decreasing the load on the network and on the database system. Current methods for providing disconnected data access to databases are based on Structured Query Language (SQL) commands.

These SQL based methods are well suited for common relational databases, but are often forced upon less common non-relational databases. Non-relational databases, such as multivalued/hierarchical databases, often implement SQL or some subset of SQL for compatibility purposes, but have other native interfaces or command languages. In order to process an SQL command, non-relational databases often require normalization or flattening. Databases like multivalued/hierarchical databases often violate the first law of normalization by allowing by an element of a database table to contain multiple separate values. Normalization or flattening of a database to satisfy the laws of normalization is inefficient and resource intensive, especially if it must occur often. Other non-relational databases may not support SQL, or even a subset of SQL.

SQL based disconnected access also uses a separate SQL command for each change that a disconnected user makes to the database. Executing a series of SQL commands in a direct sequence is also resource intensive, especially for non-relational database systems. Because of the limitations of using SQL based disconnected access with non-relational databases, disconnected access to non-relational databases is inefficient, and does not currently have the same benefits of disconnected access to relational databases.

SUMMARY OF THE INVENTION

From the foregoing discussion, it should be apparent that a need exists for an apparatus, system, and method that provide efficient disconnected access to non-relational database systems. Beneficially, such an apparatus, system, and method would use a native interface such as XML to access a non-relational database system, and would use a single network transaction for either a data retrieval from the non-relational database system, or a data write to the non-relational database system.

The present invention has been developed in response to the present state of the art, and in particular, in response to the problems and needs in the art that have not yet been fully solved by currently available disconnected access systems. Accordingly, the present invention has been developed to provide an apparatus, system, and method for providing a client with disconnected data access to a non-relational database that overcome many or all of the above-discussed shortcomings in the art.

An integration adapter to provide a client with disconnected data access to a non-relational database is provided with a plurality of modules configured to functionally execute the necessary steps of providing disconnected data access. These modules in the described embodiments include a command module, a fill module, a communications module, an edit module, an update module, a conflict module, and an Extensible Markup Language (XML) mapping definition tool.

The command module, in one embodiment, is configured to request non-relational XML data from a non-relational database using an XML mapping. In a further embodiment, the command module is configured to request the non-relational XML data in response to a non-relational data request. In a further embodiment, the non-relational database is configured to store non-relational data in a format substantially similar to an XML format. In one embodiment, the non-relational database comprises a hierarchical database, and in a further embodiment the non-relational database comprises a multivalued database. In another embodiment, the command module is further configured to request the non-relational XML data from the non-relational database in a single network transaction. In a further embodiment, the command module is further configured to request the non-relational XML data in response to user input.

In one embodiment, the XML mapping is configured to map a data source schema of the non-relational database to an XML schema. In another embodiment, the XML mapping comprises a non-relational database default mapping. In a further embodiment, the XML mapping comprises a user-defined custom mapping. In one embodiment, the XML mapping is stored in the non-relational database, and in another embodiment the XML mapping is stored in a data file accessible by the non-relational database. In a further embodiment, the XML mapping is stored in one or more data access sets.

In another embodiment, the fill module is configured to receive the non-relational XML data from the non-relational database and to populate one or more data access sets with the non-relational XML data. In one embodiment, the one or more data access sets each comprise an ADO.NET DataSet, and in another embodiment the one or more data access sets each comprise a Service Data Objects Data Graph.

In one embodiment, the communications module is configured to transmit the one or more data access sets to an integration broker in communication with the integration adapter. In another embodiment, the one or more data access sets are configured to store a change history comprising the non-relational XML data and the one or more changes to the non-relational XML data.

In a further embodiment, the edit module is configured to receive one or more changes to the non-relational XML data from at least one of the one or more data access sets. In one embodiment, the one or more changes are made by a user. In a further embodiment, the user comprises a remote network user. In one embodiment, at least one of the one or more data access sets is configured to send the one or more changes to the edit module in response to user input.

The update module, in one embodiment, is configured to send the one or more changes in the non-relational XML data to the non-relational database using the XML mapping. The integration adapter of claim 3, wherein the update module is further configured to send the one or more changes to the non-relational database in a single network transaction.

In another embodiment, the conflict module is configured to prompt a user with one or more data update options in response to one or more conflicting changes to data in the non-relational database. In one embodiment, the XML mapping definition tool is configured to assist a user in defining the XML mapping.

A system of the present invention is also presented to provide a client with disconnected data access to a non-relational database. The system may be embodied by an integration broker, a client, and a non-relational database adapter. In particular, the non-relational database adapter, in one embodiment, includes the modules described above in relation with the integration adapter.

A computer program product of the present invention is also presented for providing a client with disconnected data access to a non-relational database. The computer program product in the disclosed embodiments substantially includes the steps necessary to carry out the functions presented above with respect to the operation of the described integration adapter and system.

A method of the present invention is also presented for deploying computing infrastructure. The method in the disclosed embodiments substantially includes the steps necessary to carry out the functions presented above with respect to the operation of the described integration adapter and system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is a schematic block diagram illustrating one embodiment of an XML mapping and XML data according to the present invention;

DETAILED DESCRIPTION OF THE INVENTION

Figure 1:
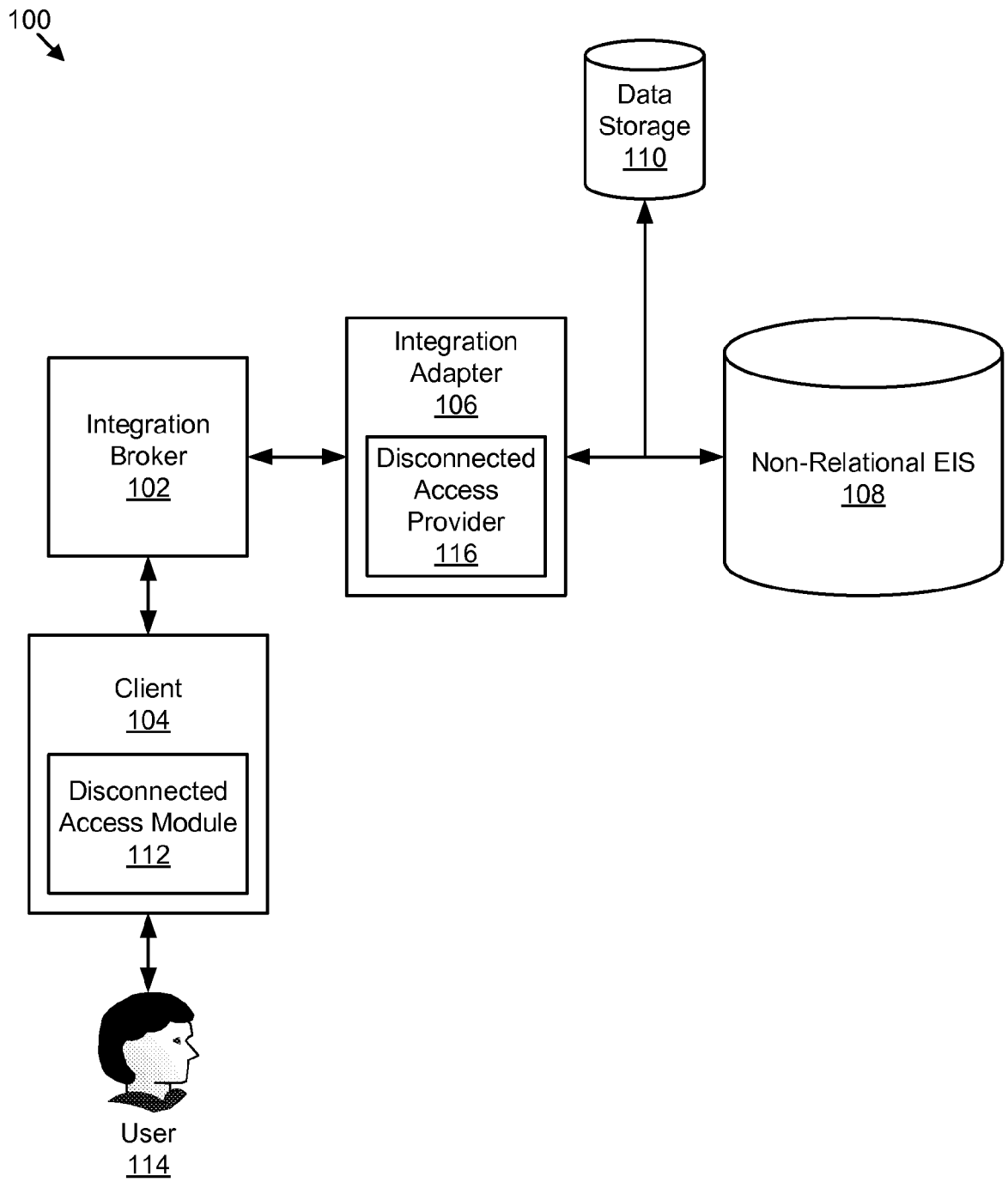
FIG. 1 is a schematic block diagram illustrating one embodiment of a system for disconnected data access in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts a system 100 for providing disconnected data access to a non-relational database. In one embodiment, the system 100 comprises an integration broker 102, a client 104, an integration adapter 106, a non-relational Enterprise Information System (EIS) 108, a data storage 110, and/or a user 114.

In one embodiment, the integration broker 102 is coupled to the client 104 and the integration adapter 106, facilitating communication between the client 104 and the integration adapter 106. Other environments, clients, integration adapters, databases, or EISs may also be coupled to the integration broker 102. The integration broker 102 may comprise a server such as a web server, an application server, or the like. In another embodiment, the integration broker 102 may comprise a data access service (DAS) or the like. The integration broker 102 may translate, reformat, transform, re-encode, or otherwise alter data between a format usable by the client 104 and a format usable by the integration adapter 106. Alternatively, the integration broker 102 may relay data between the client 104 and the integration adapter 106 without any alterations. In one embodiment, the integration broker 102 comprises a server from the WebSphere family of products by International Business Machines Corporation (IBM) of Armonk, N.Y.

The client 104 is an entity in communication with the integration broker 102. The client 104 may comprise a business application, a web browser, an EIS, a database, another integration adapter, a development environment, a business application, or another type of module that is configured to communicate with the integration broker 102. The client 104 may be resident on the same machine or system as the integration broker 102, or may be in communication with the integration broker 102 over a network such as a local area network (LAN) or a wide area network (WAN). The network may be a corporate intranet, the internet, or the like. In one embodiment, the client 104 is an entity that is suited for disconnected access to a non-relational database or EIS such as the non-relational EIS 108. For example, the client 104 may be one of many clients that access the non-relational EIS 108, and disconnected access may decrease the number of database connections to the non-relational EIS 108, or the client 104 may be connected to the integration broker 102 over a slow or expensive connection that makes disconnected access more efficient or economical. In one embodiment, the client 104 is in contact with the integration broker 102 during network transactions, such as data requests or update requests, but is substantially disconnected between network transactions.

In one embodiment, the client 104 comprises a disconnected access module 112. The disconnected access module 112 may be configured to store or otherwise communicate with one or more data access sets. The disconnected access module 112 may provide the user 114 access to the data in the one or more data access sets. The disconnected access module 112 may provide an interface for the user 114 to perform disconnected access actions, such as filling the one or more data access sets with data from the non-relational EIS 108, editing the data, and updating the original data in the non-relational EIS 108. The interface may be a graphical user interface (GUI), a command line or script interface, an application programming interface (API), or another interface that allows the user 114 to perform disconnected access actions. The disconnected access module 112 may be configured to communicate with the integration broker 102 to access the non-relational EIS 108 through the integration adapter 106 such that the disconnected access module 112 can provide the user 114 with disconnected access to the non-relational EIS 108. Alternatively, the disconnected access module 112 may communicate with the integration broker 102 through the client 104.

The integration adapter 106 is also an entity in communication with the integration broker 102. The integration adapter 106 provides a common interface for other systems, clients, modules, and the like to access the non-relational EIS 108. In one embodiment, the integration adapter 106 comprises a disconnected access provider 116. One example of the disconnected access provider 116 is provided and described in further detail with reference to FIG. 2.

In general, the disconnected access provider 116 performs the steps of providing a client with disconnected data access to the non-relational EIS 108. The disconnected access provider 116 may receive a fill request, such as a non-relational data request, from the integration broker 102, request data from the non-relational EIS 108, receive the data from the non-relational EIS 108, populate one or more data access sets with the data, and return the one or more data access sets to the integration broker 102. In a further embodiment, the disconnected access provider 116 may receive an update request from the integration broker 102, the update request comprising one or more changes to the data. The disconnected access provider may update the data in the non-relational EIS 108 with the one or more changes.

In one embodiment, the non-relational EIS 108 comprises one or more non-relational databases, database systems, or the like. The non-relational EIS 108 may track and manage data relevant to an enterprise, including sales, production, finance, accounting, human resources, and the like. Non-relational database models include hierarchical, multivalued, network, object, associative, concept-oriented, multi-dimensional, star schema, and the like. The non-relational EIS 108 may comprise databases or database systems that fall under one or more of these or other non-relational categories. Non-relational database models are not mutually exclusive. In one embodiment, the non-relational EIS 108 may comprise one or more non-relational databases that store data in a format substantially similar to an Extensible Markup Language (XML) format, such as a hierarchical database, a multivalued database, and the like. Non-relational databases do not use a relational database model, and often do not satisfy the laws of normalization that restrict the way that data is stored in relational databases.

Hierarchical databases are one type of non-relational database. Instead of using a relational model, hierarchical databases are organized into hierarchical or tree-like structures. Hierarchical databases often use parent/child relationships that are usually one-to-many relationships, each parent node may have multiple children, but each child node may not have multiple parents. Another type of non-relational database, a network database, allows child nodes to have multiple parents, or many-to-many relationships. Examples of databases using a hierarchical model include Adabas, Massachusetts General Hospital Utility Multi-Programming System (MUMPS or M), Greystone Technology MUMPS (GT.M), IBM Information Management System (IMS), Caché, Metakit, Multidimensional Hierarchical (MDH) Toolkit, Unisys Data Management System II (DMSII), FOCUS, and the like. XML may also represent data in a hierarchical format, and is well suited for representing data from hierarchical databases.

Multivalued databases are another type of non-relational database. Multivalued databases break the first law of normalization by allowing an element of a database table to contain multiple separate values, rather than storing the values separately. Some multivalued databases also allow the values to be subdivided into sub-values, making it possible to store a database table as an element of another database table. As described above, multivalued databases may be hierarchical in nature, or may include aspects of other database models. Multivalued databases are often referred to as non-first normal form (NF2) databases, nested table databases, or post-relational databases. Examples of multivalued databases include the Pick Operating System, IBM U2 (Universe, Unidata), OpenQM, Reality, various Online Analytical Processing (OLAP) databases, Microsoft Analysis Services, Extended Spread Sheet Database (ESSbase), MonetDB, PI/Open, and the like. XML is also well suited for representing data from multivalued databases.

In one embodiment, the non-relational EIS 108 comprises one or more non-relational databases and/or database systems as described above. In another embodiment, the non-relational EIS 108 is a multivalued/hierarchical database as described above that violates the first law of normalization. In a further embodiment, the non-relational EIS 108 is configured to import and/or export data in an XML format. Because of the hierarchical nature of XML, many non-relational databases are configured to efficiently import and export data in an XML format, while traditional commands, languages, and the like, such as Structured Query Language (SQL), may be inefficient, unsupported, or require normalization or flattening of the non-relational data. In a further embodiment, the non-relational EIS 108 is configured to accept an XML mapping associated with a request for XML data and to use the XML mapping to map the requested XML data to an XML schema.

In one embodiment, the data storage 110 is in communication with one or more modules in the system 100, such as the integration adapter 106 and/or the non-relational EIS 108. The data storage 110 may provide an electronic data repository for the system 100. The data storage 110 may comprise one or more magnetic or optical disk drives, read only memory (ROM), random access memory (RAM), and the like. In one embodiment, the system 100 may use the data storage 110 to store or manipulate data, such as one or more XML mappings, data access sets, meta data, system settings, data files, and the like. In a further embodiment, the data storage 110 is accessible to the integration adapter 106 and the non-relational EIS 108, such that data specified by one of the integration adapter 106 and the non-relational EIS 108 is accessible by the other.

Figure 2:
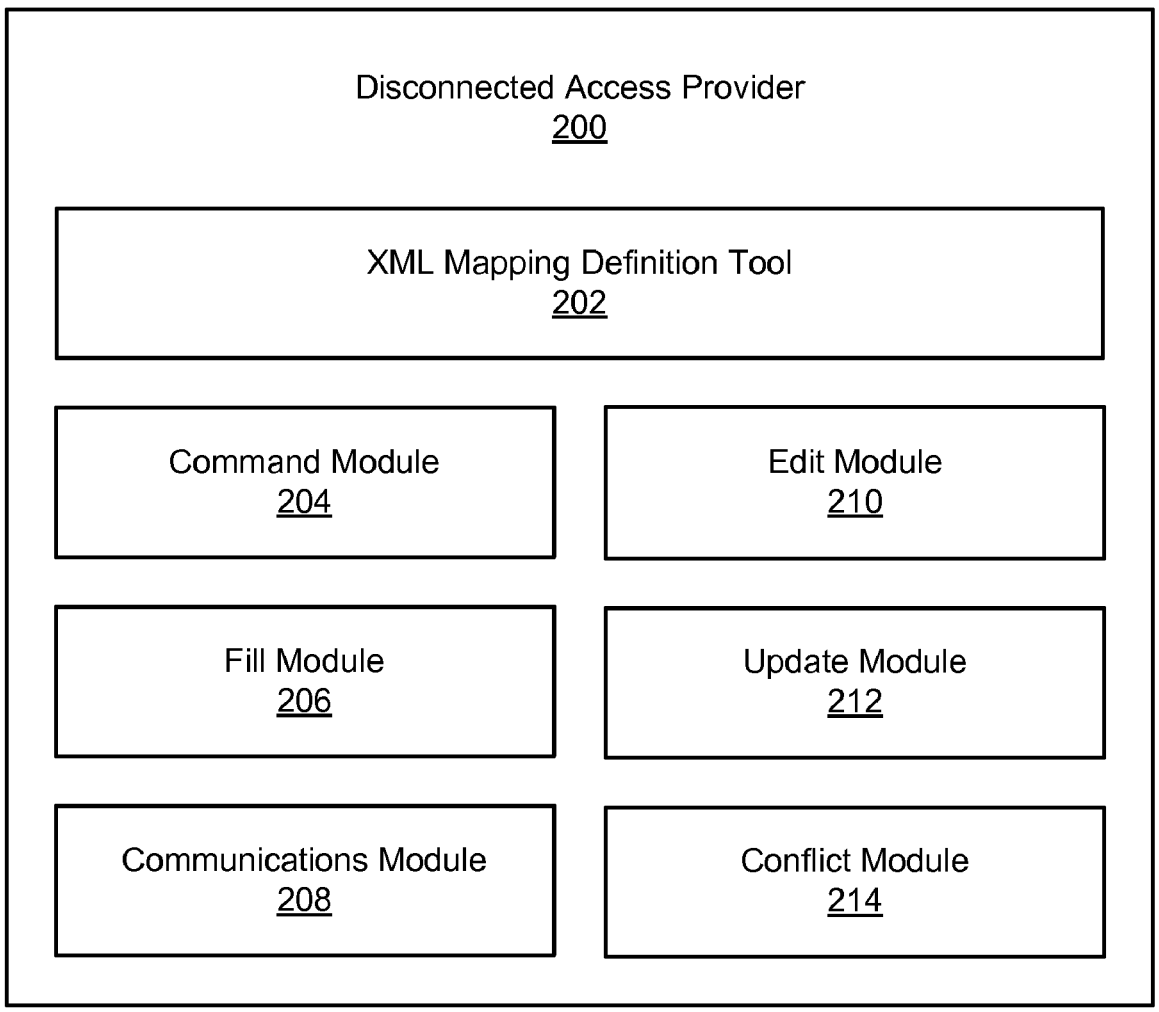
FIG. 2 is a schematic block diagram illustrating one embodiment of a disconnected access provider in accordance with the present invention.

FIG. 2 illustrates one embodiment of a disconnected access provider 200. In one embodiment, the disconnected access provider 200 is substantially similar to the disconnected access provider 116 of FIG. 1. In one embodiment, the disconnected access provider 200 may comprise an XML mapping definition tool 202, a command module 204, a fill module 206, a communications module 208, an edit module 210, an update module 212, and/or a conflict module 214. In general, the disconnected access provider 200 is configured to provide a client with disconnected access to a non-relational database.

In one embodiment, the disconnected access provider 200 comprises an XML mapping definition tool 202 that is configured to assist a user in defining an XML mapping. One example of an XML mapping is provided and described in further detail with reference to FIG. 4. In general, an XML mapping is a file, data structure, or the like that maps a data source schema of a non-relational database to an XML schema. In one embodiment, the XML mapping definition tool 202 is configured to allow a user to select a default XML mapping or to define a custom XML mapping. The XML mapping definition tool 202 may use a GUI, a command line or script interface, an API, another interface to communicate with the user. In another embodiment, the XML mapping definition tool 202 may receive input from a user through an integration broker or the like. In one embodiment, the XML mapping definition tool 202 may be used to define an XML mapping at a time prior to a runtime of the other modules in the disconnected access provider 200 such that an XML mapping is already defined at runtime.

The default XML mapping that the XML mapping definition tool 202 uses may be predefined by a user, defined by a non-relational EIS or database, defined by the XML mapping definition tool 202, defined by the disconnected access provider 200, or the like. In one embodiment, the non-relational EIS or database provides a default XML mapping that uses existing table names, field names, and the like from one or more existing non-relational databases such that the XML schema of the default XML mapping is substantially similar to a data source schema of at least a portion of the non-relational EIS or database. In one embodiment, if a non-relational EIS or database does not have a default XML mapping, the XML mapping definition tool 202 may access the non-relational EIS or database to discover the data source schema and to build a default XML mapping. In one embodiment, the XML mapping definition tool 202 may provide multiple default mapping definitions for the user to select from. In one embodiment, the XML mapping definition tool 202 is part of the non-relational EIS.

In one embodiment, the XML mapping definition tool 202 allows the user to define a custom XML mapping. The user may wish to only use a subset of the data source schema, to use custom names or identifiers, or to otherwise alter or customize how the data source schema is mapped to an XML schema. The XML mapping definition tool 202 may graphically present the data source schema to the user such that the user may select a portion of the data source schema to map, may provide a text editor such that the user may enter an XML mapping, or may otherwise assist the user in creating an XML mapping. The XML mapping definition tool 202 may store the XML mapping in data storage that is accessible by both the disconnected access provider 200 and the non-relational EIS or database, in the metadata of a data access set, in the non-relational EIS or database, or in other data storage.

In one embodiment, the disconnected access provider 200 comprises a command module 204. The command module 204 is configured to receive one or more requests for non-relational data stored in a non-relational EIS or database. In a further embodiment, the one or more requests are for non-relational XML data. The one or more requests may comprise an XML mapping, a reference to an XML mapping, a pointer to an XML mapping, or the like. In one embodiment, a request that does not comprise an XML mapping or the like comprises an implicit request for the command module 204 to use a default XML mapping. The one or more requests may come from a client, module, or the like that is configured for disconnected access. The one or more requests may come directly from the client, module, or the like, or may come through an integration broker or other intermediary.

In one embodiment, the command module 204 requests non-relational data from a non-relational EIS or database in response to a non-relational data request. The command module 204 may request the non-relational data using an XML mapping. The XML mapping may comprise a default XML mapping or a custom XML mapping, and may be explicitly or implicitly defined in the non-relational data request. For example, the command module 204 may request the non-relational data using a command supported by the non-relational EIS or database, such as an XML query, an XML-extended query or the like. In one embodiment, the command module 204 is configured to request the non-relational data in a single command, network transaction, or the like. For example, a command similar to "LIST STUDENT ALL TOXML" may return non-relational XML data from a database or table identified by "STUDENT." The command does not explicitly specify an XML mapping, so the command module 204 may format the requested XML data according to a default XML mapping. In another example, a command similar to "DB.TOXML STUDENT.XML STUDENT.MAP" may return non-relational XML data in a file "STUDENT.XML." Because the second command specifies an XML mapping, the command module 204 may format the requested XML data according to the XML mapping "STUDENT.MAP." Because such requests comprise a single command, they can be executed in a single network transaction, and are well suited for disconnected access situations.

In one embodiment, the disconnected access provider 200 comprises a fill module 206. The fill module 206 may be configured to receive non-relational XML data from a non-relational EIS or database. The fill module 206 may receive the non-relational XML data in response to a non-relational data request from the command module 204. The non-relational XML data may comprise a data file, a data structure, a pointer or reference to a data file or data structure, or the like. The non-relational XML data may be formatted according to an XML schema defined in a XML mapping, such as a default or custom XML mapping. One example of XML data is provided and described in further detail with reference to FIG. 4.

In one embodiment, the fill module 206 populates one or more data access sets with the non-relational XML data. One example of a data access set is provided and described in further detail with reference to FIG. 3. The one or more data access sets may comprise data providers such as Microsoft ADO.NET DataSets, Service Data Objects (SDO) data graphs, or the like. The data access sets may comprise an in-memory cache of data retrieved from a data source such as a non-relational EIS or database. In one embodiment, the data access sets may store data as business objects such as ADO.NET DataTable objects, SDO DataObjects, and the like. The data access sets may be configured to read and write data, schemas, and the like in an XML format. In one embodiment, the data access sets are configured to allow data changes and to track and store the changes in a change history or the like. The data access sets may import non-relational XML data, track one or more changes to the non-relational XML data, and export the one or more changes. In one embodiment, the command module 204 and/or the fill module 206 comprise an implementation of a Fill( ) method in a Microsoft ADO.NET IDataAdapter.

In one embodiment, the disconnected access provider 200 comprises a communications module 208. The communications module 208 transmits one or more data access sets from the fill module 206 to an integration broker or the like. The communications module 208 may transmit the one or more data access sets, or pointers, references, or the like to the one or more data access sets. In one embodiment, the communications module 208 transmits the one or more data access sets, pointers, references, or the like to the integration broker such that other users, clients, modules, and the like can access the data access sets through the integration broker. In one embodiment, the integration broker transmits the data access sets to another user, client, module, or the like.

In one embodiment, the disconnected access provider 200 comprises an edit module 210. The edit module 210 is configured to receive one or more changes to non-relational XML data from at least one data access set. In a further embodiment, the edit module 210 may receive the one or more changes to the non-relational XML data and the unchanged non-relational XML data. In one embodiment, the one or more changes are made by a user. The one or more changes may comprise new data, updated data, deleted data, and the like. In one embodiment, the one or more changes are in an XML format. In one embodiment, the edit module 210 receives the one or more changes in response to user input, such as an update command or the like.

In one embodiment, the disconnected access provider 200 comprises an update module 212. The update module 212 sends the one or more data changes from the edit module 210 to the non-relational EIS or database. In one embodiment, the update module 212 may send an XML mapping or a reference or pointer to an XML mapping to the non-relational EIS or database with the one or more data changes. The non-relational EIS or database may update the data stored in the non-relational EIS or database using the one or more data changes and the XML mapping. In one embodiment, the edit module 210 and/or the update module 212 may comprise an implementation of an Update( ) method in a Microsoft ADO.NET IDataAdapter.

In one embodiment, more than one user, client, module, and the like are configured for simultaneous disconnected access to the non-relational EIS or database, and the disconnected access provider comprises a conflict module 214. The conflict module 214 may be configured to prompt the user with one or more update options in response to one or more conflicting changes to data in the non-relational EIS or database. The conflict module 214 may use a log, a history, a lock file, original data stored in a data access set, or the like to determine when a conflicting change has been made to the data in the non-relational EIS or database. The one or more update options may comprise overwrite, cancel update, copy to new record, undo change, delete record, and the like. The conflict module 214 may present the user with the update options once and apply the user's selection to multiple conflicting changes, or the conflict module 214 may prompt the user for a selection for each conflicting change. In a further embodiment, the conflict module 214 is configured to follow a predefined conflict policy selected by the user.

Figure 3:
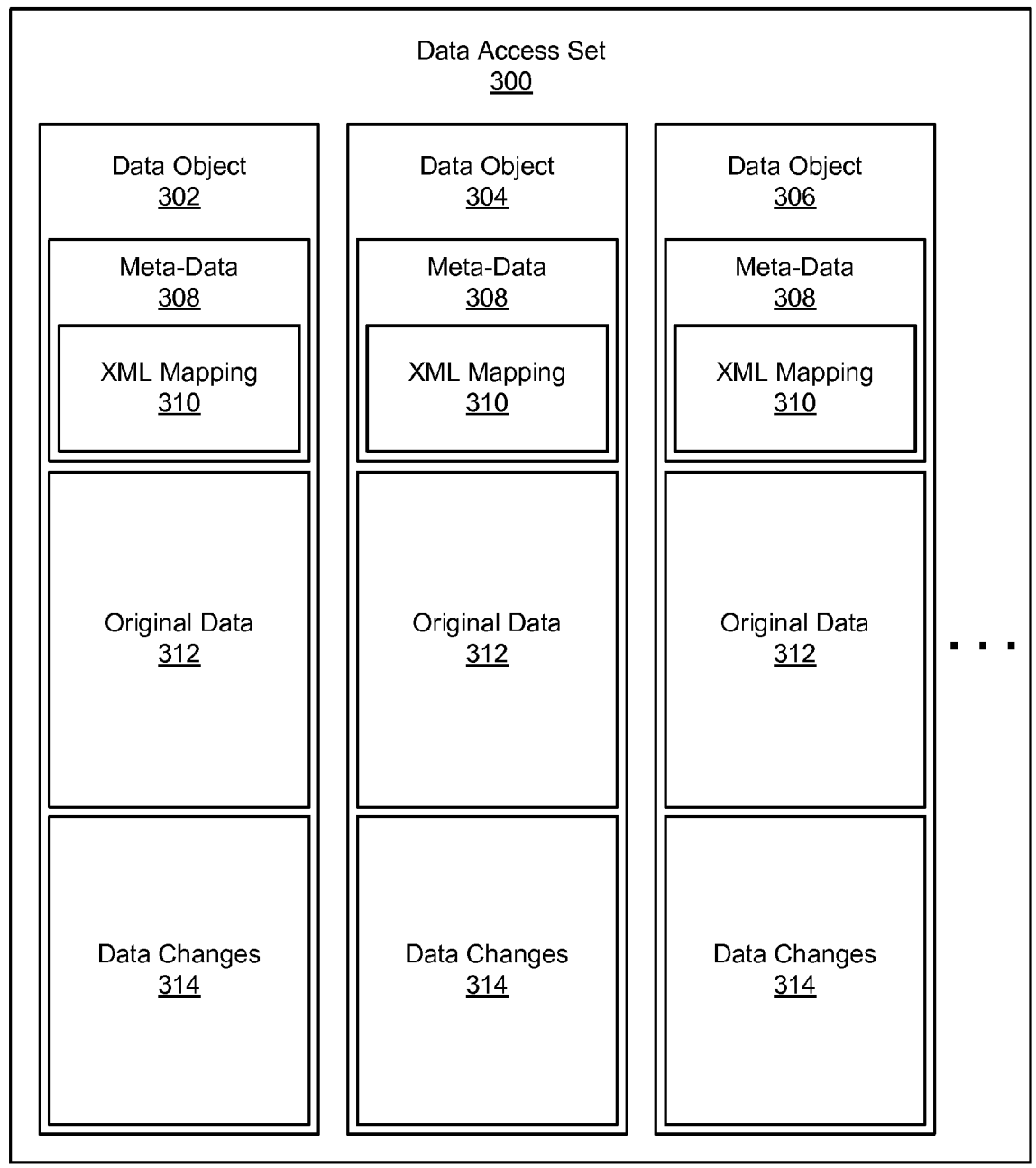
FIG. 3 is a schematic block diagram illustrating one embodiment of a data access set in accordance with the present invention.

FIG. 3 illustrates one example of a data access set 300. The data access set 300 may be substantially similar to the data access sets described above in relation to FIG. 2. The data access set may be an ADO.NET DataSet, an SDO data graph, or another data provider. The data access set 300 may be configured to perform actions such as import, export, read, write, and the like on XML data. The data access set 300 may comprise one or more data objects 302, 304, 306.

In one embodiment, each of the data objects 302, 304, 306 may comprise meta-data 308, an XML mapping 310, original data 312, and/or data changes 314. The data objects 302, 304, 306 may be business objects or other data structures. In one embodiment, the data objects 302, 304, 306 are ADO.NET DataTable objects, and may be related to each other with ADO.NET DataRelation objects. In another embodiment, the data objects 302, 304, 306 are SDO data objects, and may be organized in a graph. The data objects 302, 304, 306 may be arranged hierarchically, and may include sub-data objects and the like.

Each of the data objects 302, 304, 306 may comprise meta-data 308. The meta-data 308 may be data defining, related to, and/or identifying the data objects 302, 304, 306. In one embodiment, the meta-data 308 may comprise an XML mapping 310. One example of an XML mapping that may be substantially similar to the XML mapping 310 is provided and described in further detail with reference to FIG. 4. The XML mapping 310 may map a data schema of a data source to an XML schema. The XML mapping 310 may be a full XML mapping or a pointer or reference to an XML mapping. In another embodiment, the XML mapping 310 is not stored in the data objects 302, 304, 306, but is stored in a database, separate data storage, an integration adapter, or elsewhere.

The data objects 302, 304, 306 may comprise original data 312 and data changes 314, or may otherwise represent both current and original data, such that the data objects 302, 304, 306 and the data access set 300 can make current data, original data, data changes and the like available. The data changes 314 may comprise the changed or updated data, or the data changes 314 may comprise a change history or the like such that the current changed or updated data can be constructed. In another embodiment, the data changes 314 comprise the current data, including changes or updates, and the original data 312 comprises an undo history or the like such that the original data can be constructed. Although varying configurations are possible, the data objects 302, 304, 306 may store the original data 312 and the data changes 314, such that current data, original data, and data changes are implicitly or explicitly known and may be exported.

FIG. 4 illustrates one example of an XML mapping 400 and XML data 402. In one embodiment, the XML mapping 400 is a data file that is identified by a name 404. In the illustrated example, the name 404 is "STUDENT.MAP." In another embodiment, the XML mapping 400 is stored as metadata or a database record and not as a data file. In one embodiment, the XML mapping 400 comprises configuration data 406. The configuration data 406 may comprise names, options, version or protocol definitions, and the like. In one embodiment, the XML mapping 400 comprises mapping data 408. The mapping data 408 is configured to map a data source schema to an XML schema. The mapping data 408 may map one or more XML schema nodes 410 to one or more data source schema elements 412. In one embodiment, the one or more XML schema nodes 410 may be XML elements or attributes. In the illustrated example, the "@" in the name of the schema node 410 denotes that the schema node 410 is an XML attribute, while no "@" would denote that the schema node 410 was an XML element. In the illustrated example, the data source schema element 412 is a "Column," but the mapping data 408 may comprise other data source schema elements that are part of a non-relational EIS or database. The types of data source schema elements that may be used may be defined by the non-relational EIS or database, and may vary depending on the type of EIS or database.

The XML data 402 may be a response to a data request sent to a non-relational EIS or database. The XML data 402 may be a data file, a data object, or the like. In one embodiment, the XML data 402 is a data file that is identified by a name 414. In the illustrated example, the name 414 is "STUDENT.XML." In one embodiment, the XML data 402 comprises configuration data 416. The configuration data 416 may comprise names, options, version or protocol definitions, and the like. In one embodiment, the XML data 402 comprises non-relational XML data 418. The non-relational XML data 418 is formatted based on the mapping data 408 in the XML mapping 400.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
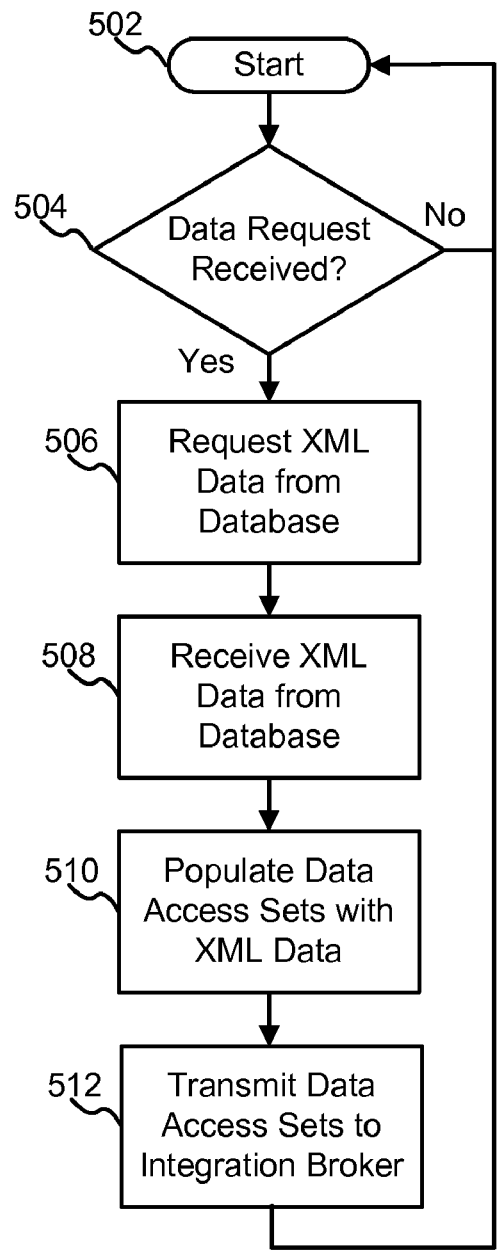
FIG. 5 is a schematic flow chart diagram illustrating one embodiment of a method for providing disconnected data access in accordance with the present invention.

FIG. 5 illustrates one embodiment of a method 500 for providing disconnected data access. The method 500 starts 502. In one embodiment, the user 114 has defined an XML mapping 400 using the XML mapping definition tool 202 prior to the start 502 of the method 500. The command module 204 waits 504 for a data request. If the command module 204 receives 504 a data request, the command module 204 requests 506 XML data 402 from the EIS or database 108 in response to the data request. The data request may implicitly or explicitly include or define the XML mapping 400, and the command module 204 may use the XML mapping 400 when requesting 506 the XML data 402 from the EIS or database 108. The fill module 206 receives 508 the XML data 402 from the EIS or database 108, and populates 510 one or more data access sets 300 with the XML data 402. The communications module 208 transmits 512 the data access sets 300 or references or pointers to the data access sets 300 to the integration broker 102, and the method 500 starts 502 again.

Figure 6:
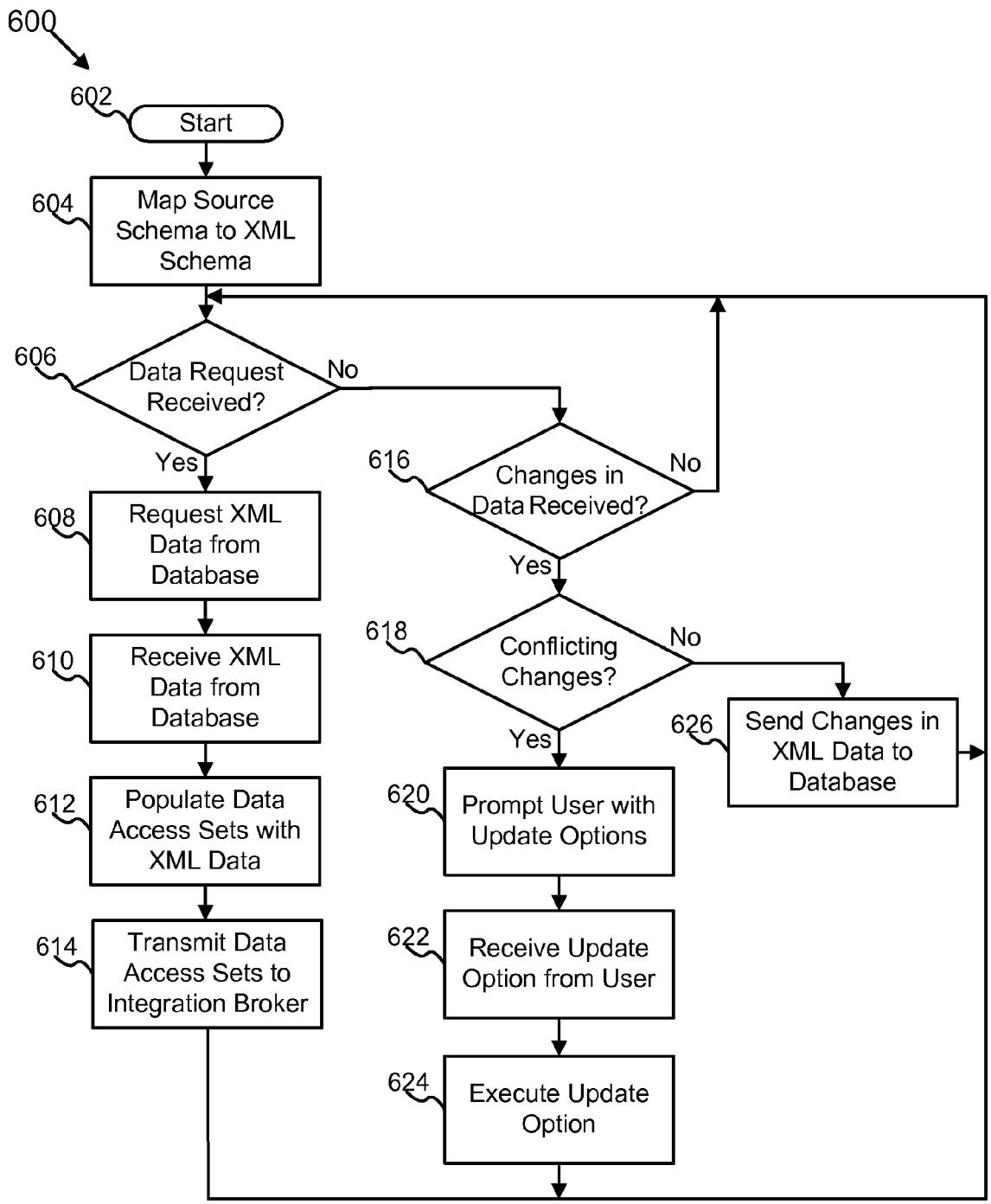
FIG. 6 is a schematic flow chart diagram illustrating another embodiment of a method for providing disconnected data access in accordance with the present invention.

FIG. 6 illustrates another embodiment of a method 600 for providing disconnected data access. The method 600 starts 602. The user 114 uses the mapping definition tool 202 to map 604 a data source schema to an XML schema, defining 604 the XML mapping 400. The command module 204 determines 606 whether it has received a non-relational data request. If the command module 204 determines 606 that it has received a non-relational data request, the command module 204 requests 608 non-relational XML data 402 from the non-relational EIS or database 108 in response to the non-relational data request. The non-relational data request may implicitly or explicitly include or define the XML mapping 400, and the command module 204 may use the XML mapping 400 when requesting 608 the non-relational XML data 402 from the non-relational EIS or database 108. The fill module 206 receives 610 the non-relational XML data 402 from the non-relational EIS or database 108, and populates 612 one or more data access sets 300 with the non-relational XML data 402. The communications module 208 transmits

614 the data access sets 300 or references or pointers to the data access sets 300 to the integration broker 102, and the method 600 returns to the data request determination step 606.

If the command module 204 determines 606 that it has not received a non-relational data request, the edit module 210 determines 616 whether it has received changes in the non-relational XML data from at least one of the data access sets 300. If the edit module 210 determines 616 that it has not received changes in the non-relational XML data, the method 600 returns to the data request determination step 606. If the edit module 210 determines 616 that it has received changes in the non-relational XML data, the conflict module 214 determines 618 whether one or more of the changes conflict with previous changes. If the conflict module 214 does not detect 618 conflicting changes, the update module 212 sends 626 the changes in the non-relational XML data to the non-relational EIS or database 108 and the method 600 returns to the data request determination step 606. If the conflict module 214 detects 618 one or more conflicting changes, then the conflict module 214 prompts 620 the user 114 with one or more update options. The conflict module 214 receives 622 a selected update option from the user 114. The conflict module 214 executes 624 the update option, which may comprise canceling the update, sending the changes to the non-relational EIS or database 108, deleting a record, copying a record, or the like. The method 600 returns to the data request determination step 606.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing a client with disconnected data access to a non-relational database, the method comprising:
   providing an Extensible Markup Language (XML) schema for a non-relational data request;
   performing the non-relational data request for non-relational XML data from a non-relational database having a data source schema different than the XML schema, using an XML mapping from the data source schema to the XML schema in processing the non-relational data request;
   receiving the non-relational XML data from the non-relational database;
   disconnecting from the non-relational database after receiving the non-relational XML data;
   populating one or more data access sets with the non-relational XML data; and
   transmitting the one or more data access sets to an integration broker configured to facilitate communication with one or more clients to read and write the non-relational XML data stored in the data access sets.

2. The method of claim 1, further comprising receiving one or more changes to the non-relational XML data from at least one of the one or more data access sets.

3. The method of claim 2, further comprising sending the one or more changes in the non-relational XML data to the non-relational database using the XML mapping.

4. The method of claim 1, further comprising mapping the data source schema of the non-relational database to the XML schema to form the XML mapping.

5. The method of claim 1, wherein the non-relational database is configured to store non-relational data in a format substantially similar to an XML format.

6. The method of claim 5, wherein the non-relational database comprises at least one of a hierarchical database and a multivalued database.

7. The method of claim 1, wherein the XML mapping comprises one of a non-relational database default mapping and a user-defined custom mapping.

8. The method of claim 1, wherein the XML mapping is stored in one of the non-relational database, a data file accessible by the non-relational database, and the one or more data access sets.

9. The method of claim 1, wherein the requesting of non-relational XML data from the non-relational database is performed in a single network transaction and wherein the sending of the one or more changes to the non-relational database is performed in a single network transaction.

10. The method of claim 3, further comprising detecting one or more conflicting changes to data in the non-relational database and prompting a user with one or more data update options.

11. The method of claim 1, wherein the one or more data access sets each comprise one of an ADO.NET DataSet and a Service Data Objects Data Graph.

12. The method of claim 2, wherein the one or more changes are made by a user.

13. The method of claim 2, wherein the at least one of the one or more data access sets is configured to send the one or more changes to the edit module in response to one of user input and a request from the edit module.

14. The method of claim 1, wherein the requesting of the non-relational XML data is performed in response to user input.

15. The method of claim 2, wherein the one or more data access sets are further configured to store a change history comprising the non-relational XML data and the one or more changes to the non-relational XML data.

16. The method of claim 1, further comprising assisting a user to define the XML mapping.

17. A method for providing a client with disconnected data access to a non-relational database, the method comprising:
   mapping a data source schema of a non-relational database to an Extensible Markup Language (XML) schema different than the data source schema to form an XML mapping;
   providing the XML schema for a non-relational data request;
   performing the non-relational data request for non-relational XML data from the non-relational database using the XML mapping from the data source schema to the XML schema in processing the non-relational data request;
   receiving the non-relational XML data from the non-relational database;
   disconnecting from the non-relational database after receiving the non-relational XML data;
   populating one or more data access sets with the non-relational XML data;
   editing the non-relational XML data in the data access sets in response to input from a user;
   storing one or more changes to the non-relational XML data in the data access sets;
   reconnecting to the non-relational database prior to updating data in the non-relational database; and
   updating data in the non-relational database based on the one or more changes using the XML mapping.

18. The method of claim 17, further comprising detecting one or more conflicting changes to data in the non-relational database, prompting the user with one or more data update options, receiving a chosen update option from the user, and executing the chosen update option.

19. A method for providing a client with disconnected data access to a multivalued/hierarchical database, the method comprising:

provinding an Extensible Markup Language (XML) schema for a data request from a client through an integration broker;

performing the data request for XML data from a multivalued/hierarchical database having a data source schema different than the XML schema, using an XML mapping in processing the data request, the XML mapping configured to map the data source schema of the multivalued/hierarchical database to the XML schema;

receiving the XML data from the multivalued/hierarchical database;

disconnecting from the multivalued/hierarchical database after receiving the XML data;

populating one or more data access sets with the XML data; and transmitting the one or more data access sets to the integration broker configured to facilitate communication with one or more clients to read and write the XML data stored in the data access sets.

20. The method of claim 19, further comprising receiving one or more changes to the XML data from at least one of the one or more data access sets and sending the one or more changes in the XML data to the multivalued/hierarchical database using the XML mapping.

* * * * *